US011186262B2

(12) United States Patent
Boyce et al.

(10) Patent No.: US 11,186,262 B2
(45) Date of Patent: Nov. 30, 2021

(54) SYSTEM AND METHOD FOR CONTROLLING COMPOUNDING IN A BRAKE ACTUATOR

(71) Applicant: Bendix Commercial Vehicle Systems LLC, Elyria, OH (US)

(72) Inventors: Daniel T. Boyce, Akron, OH (US); Christopher H. Hutchins, Bay Village, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 332 days.

(21) Appl. No.: 16/157,214

(22) Filed: Oct. 11, 2018

(65) Prior Publication Data

US 2020/0114892 A1 Apr. 16, 2020

(51) Int. Cl.
| | |
|---|---|
| B60T 13/68 | (2006.01) |
| B60T 13/22 | (2006.01) |
| B60T 13/58 | (2006.01) |
| F16D 65/16 | (2006.01) |
| F16D 121/06 | (2012.01) |

(52) U.S. Cl.
CPC ............ B60T 13/686 (2013.01); B60T 13/22 (2013.01); B60T 13/588 (2013.01); F16D 65/16 (2013.01); F16D 2121/06 (2013.01)

(58) Field of Classification Search
CPC ...... B60T 13/686; B60T 17/083; B60T 13/22; B60T 13/588; B60T 13/683; F16D 65/16
See application file for complete search history.

(56) References Cited

U.S. PATENT DOCUMENTS

| 7,300,118 B2 | 11/2007 | Hoover et al. |
| 7,493,993 B2 | 2/2009 | Pettersson |

(Continued)

FOREIGN PATENT DOCUMENTS

| DE | 10 2011 101 438 A1 | 11/2012 |
| DE | 10 2013 106 260 A1 | 12/2014 |

(Continued)

OTHER PUBLICATIONS

Machine Translation of DE 10 2013 106 260 A1.

(Continued)

*Primary Examiner* — Alan D Hutchinson
*Assistant Examiner* — Andy Schneider
(74) *Attorney, Agent, or Firm* — Reising Ethington P.C.

(57) ABSTRACT

A system for controlling compounding in a vehicle brake actuator includes first and second valves configured to control, respectively, a first fluid pressure in a parking brake chamber of a brake actuator that acts against a spring force applied by a spring of the actuator to a pushrod of the actuator and a second fluid pressure in a service brake chamber of the actuator that applies a fluid force to the pushrod. A controller is configured to receive first and second fluid pressure signals indicative of the first and second fluid pressures, determine a total brake actuator force applied to the pushrod responsive to the first and second fluid pressure signals and control at least one of the first and second valves responsive to the total brake actuator force to adjust a corresponding one of the first and second fluid pressures and thereby obtain an adjusted total brake actuator force.

20 Claims, 3 Drawing Sheets

(56) References Cited

U.S. PATENT DOCUMENTS

| | | |
|---|---|---|
| 9,157,543 B2 | 10/2015 | Herges |
| 9,278,678 B2 | 3/2016 | Rudolph et al. |
| 2010/0106385 A1* | 4/2010 | Ramler .................. B60T 15/48 |
| | | 701/70 |
| 2016/0375884 A1* | 12/2016 | Farres .................... B60T 17/18 |
| | | 701/70 |
| 2018/0170337 A1* | 6/2018 | Abrahamsson ....... B60T 13/686 |

FOREIGN PATENT DOCUMENTS

| | | |
|---|---|---|
| DE | 10 2015 015 271 A1 | 6/2016 |
| EP | 2 134 580 B1 | 12/2010 |
| EP | 2 240 352 B1 | 10/2012 |
| EP | 3 112 230 A1 | 1/2017 |
| EP | 3 150 450 B1 | 3/2018 |
| GB | 2 145 485 B | 8/1987 |
| GB | 2 490 925 A | 11/2012 |
| KR | 10-2018-0053910 A | 5/2018 |
| WO | 2012/175927 A1 | 12/2012 |
| WO | 2014/202131 A1 | 12/2014 |
| WO | 2016/166272 A1 | 10/2016 |
| WO | 2016/169973 A1 | 10/2016 |
| WO | 2016/177458 A1 | 11/2016 |

OTHER PUBLICATIONS

Machine Translation of DE 10 2015 015 271 A1.
Machine Translation of EP 2 240 352 B1.
Machine Translation of EP 3 112 230 A1.
Machine Translation of WO 2014/202131 A1.
Machine Translation of WO 2016/166272 A1.
Machine Translation of WO 2016/169973 A1.
Machine Translation of WO 2016/177458 A1.
"International Specialized Trailers Choose Haldex ABS and Gold Seal Actuators" (https://www.truckinginfo.com/148696/international-specialized-trailers-choose-haldex-abs-and-gold-seal-actuators) (Jun. 10, 2008).
Knorr-Bremse Systeme fur Nutzfahrzeuge GmbH, "Product Catalogue—Brake and Air Suspension Products for Trailers," (Feb. 27, 2008).
Blue Bird Corporation, "Blue Bird Vision Service Manual 2010" pp. 249-476 (2006).
Knorr-Bremse Systeme fur Nutzfahrzeuge GmbH, "Product Manual—Trailer EBS TEBS G2 and G2.1" (2009).
International Search Report issued in corresponding International (PCT) Patent Application No. PCT/US2019/055090 (dated Jan. 30, 2020).
Written Opinion issued in corresponding International (PCT) Patent Application No. PCT/US2019/055090 (dated Jan. 30, 2020).

* cited by examiner

SYSTEM AND METHOD FOR CONTROLLING COMPOUNDING IN A BRAKE ACTUATOR

BACKGROUND OF THE INVENTION a. Field of the Invention

This invention relates to a system and method for controlling compounding in a brake actuator of a vehicle. In particular, this invention relates to a system and method for controlling compounding without using an anti-compounding valve.

b. Background Art

A conventional vehicle brake actuator generates actuating forces during both service braking and parking or emergency braking. The brake actuator includes a housing defining a service brake chamber and a parking brake chamber. The service brake chamber includes a diaphragm that acts on a pushrod extending from the service brake chamber when fluid pressure is supplied to the service brake chamber in order to set the service brake. The parking brake chamber includes a spring that acts on the same pushrod to set the parking brake and a diaphragm that acts against the spring when fluid pressure is supplied to the parking brake chamber to release the parking brake. In some circumstances, fluid pressure forces in the service brake chamber and spring forces in the parking brake chamber may be compounded, or applied simultaneously, against the pushrod. For example, when a vehicle is parked on a hill, the vehicle operator will typically press a foot pedal to apply the service brake before releasing the parking brake. The excess force from compounding can reduce the life of the brake actuator pushrod and downstream brake components such as slack adjusters.

In order to limit or prevent compounding, many vehicles incorporate a specific anti-compounding valve. The valve attempts to prevent the forces on the actuator pushrod from exceeding a predetermined maximum force by monitoring the fluid pressure levels in the parking brake chamber and service brake chamber and releasing fluid pressure from the parking brake chamber in proportion to the fluid pressure supplied to the service brake chamber. Anti-compounding valves, however, add expense and weight to the vehicle. As a result, many vehicles operate without anti-compounding valves and sacrifice some of the life of components in the brake actuator and downstream components such as slack adjusters.

The inventor herein has recognized a need for a system and method for controlling compounding in a brake actuator of a vehicle that will minimize and/or eliminate one or more of the above-identified deficiencies.

BRIEF SUMMARY OF THE INVENTION

This invention relates to a system and method for controlling compounding in a brake actuator of a vehicle. In particular, this invention relates to a system and method for controlling compounding without using an anti-compounding valve.

A system for controlling compounding in a brake actuator of a vehicle in accordance with one embodiment includes a first valve configured to control a first fluid pressure in a parking brake chamber of a brake actuator that acts against a spring force applied by a spring of the brake actuator to a pushrod of the brake actuator. The system further includes a second valve configured to control a second fluid pressure in a service brake chamber of the brake actuator that applies a fluid force to the pushrod of the brake actuator. The system further includes a controller configured to receive a first fluid pressure signal indicative of the first fluid pressure and receive a second fluid pressure signal indicative of the second fluid pressure. The controller is further configured to determine a total brake actuator force applied to the pushrod of the brake actuator responsive to the first fluid pressure signal and second fluid pressure signal. The controller is further configured to control, responsive to the total brake actuator force, at least one of the first valve and the second valve to adjust a corresponding one of the first fluid pressure and the second fluid pressure and thereby obtain an adjusted total brake actuator force.

An article of manufacture in accordance with one embodiment includes a non-transitory computer storage medium having a computer program encoded thereon that when executed by a controller controls compounding in a brake actuator of a vehicle. The computer program includes code for determining a total brake actuator force applied to a pushrod of a brake actuator responsive to a first fluid pressure in a parking brake chamber of the brake actuator that acts against a spring force applied by a spring of the brake actuator to a pushrod of the brake actuator and a second fluid pressure in a service brake chamber of the brake actuator that applies a fluid force to the pushrod of the brake actuator. The computer program further includes code for controlling, responsive to the total brake actuator force, at least one of a first valve configured to control the first fluid pressure and a second valve configured to control the second fluid pressure to adjust a corresponding one of the first fluid pressure and the second fluid pressure and thereby obtain an adjusted total brake actuator force.

A method for controlling compounding in a brake actuator of a vehicle in accordance with one embodiment includes the step of receiving a first fluid pressure signal indicative of a first fluid pressure in a parking brake chamber of a brake actuator that acts against a spring force applied by a spring of the brake actuator to a pushrod of the brake actuator. The method further includes the step of receiving a second fluid pressure signal indicative of a second fluid pressure in a service brake chamber of the brake actuator that applies a fluid force to the pushrod of the brake actuator. The method further includes the step of determining a total brake actuator force applied to the pushrod of the brake actuator responsive to the first fluid pressure signal and the second fluid pressure signal. The method further includes the step of controlling, responsive to the total brake actuator force, at least one of a first valve configured to control the first fluid pressure and a second valve configured to control the second fluid pressure to adjust a corresponding one of the first fluid pressure and the second fluid pressure and thereby obtain an adjusted total brake actuator force.

A system and method for controlling compounding in a brake actuator of a vehicle in accordance the present teachings represent an improvement as compared to conventional systems and methods. In particular, the system and method enable control of compounding using existing vehicle fluid system components thereby avoiding the need for a special purpose anti-compounding valve. As a result, compounding control can be implemented on vehicles to preserve the life of brake actuator components and other vehicle components without incurring the additional expense and weight of an anti-compounding valve. The inventive system and method also enable more precise and rapid control of compounding and the ability to adjust compounding strategies for different vehicle operating conditions.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
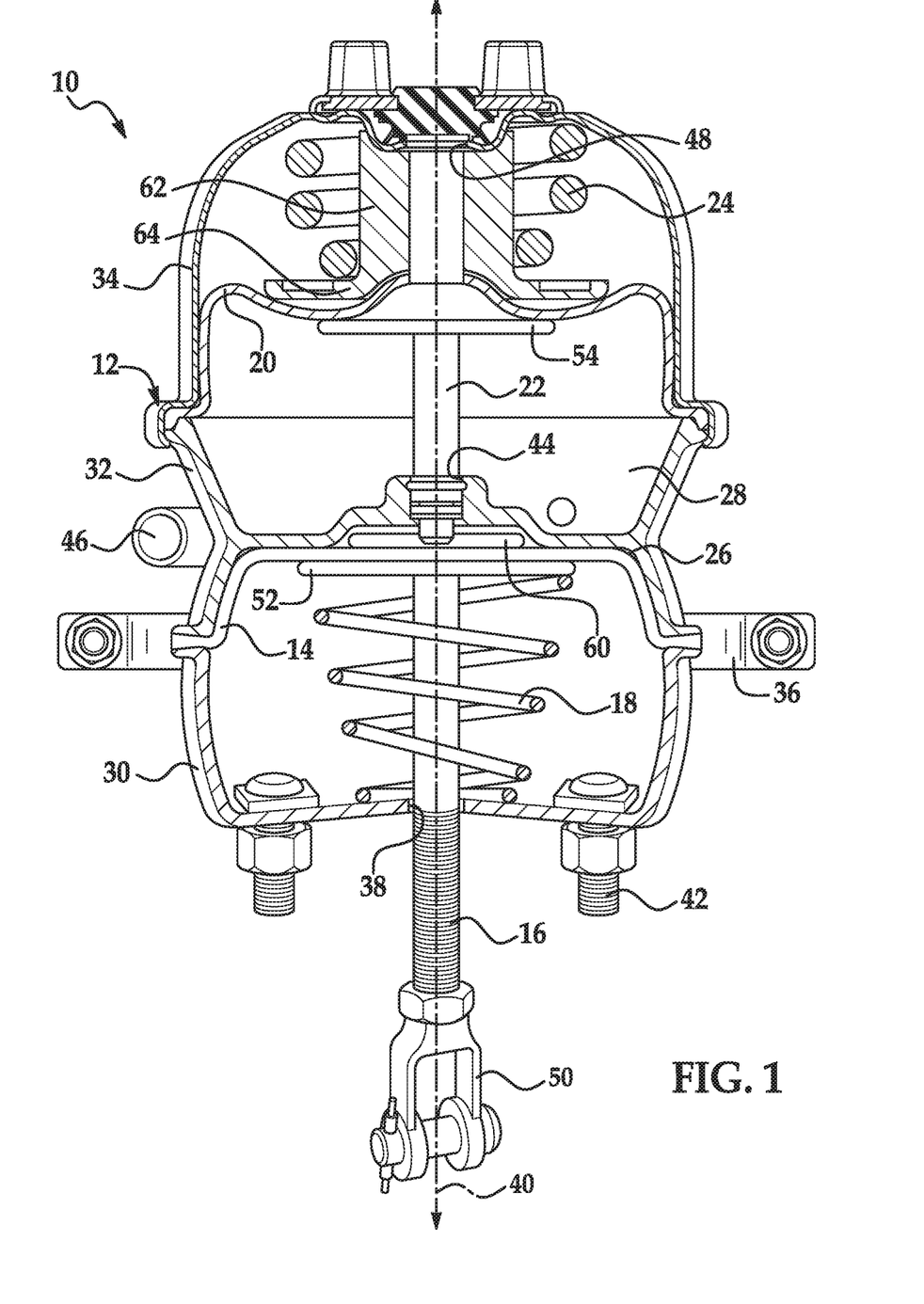
FIG. 1 is a cross-sectional view of a conventional brake actuator.

Referring now to the drawings wherein like reference numerals are used to identify identical components in the various views, FIG. 1 illustrates a conventional brake actuator 10 for a vehicle. Actuator 10 is provided to control actuation and release of brakes associated with one or more vehicle wheels. Actuator 10 may include a housing 12, a service diaphragm 14, a service pushrod 16 movable between a service release position (shown in FIG. 2) and service apply position, a service spring 18, a parking diaphragm 20, a parking pushrod 22 movable between a parking release position (shown in FIG. 2) and a parking apply position, and a parking spring 24.

Housing 12 provides structural support for the other components of actuator 10 and protects those components from foreign objects and elements. Housing 12 further defines a service brake chamber 26 and a parking brake chamber 28. Housing 22 may include multiple housing members 30, 32, 34. Members 30, 32 together define service brake chamber 26 and receive service diaphragm 14 therebetween. Members 30, 32 may be held in place by a conventional clamp 36 disposed about the circumference of housing 12. Member 30 defines a central aperture 38 centered about an axis 40 and through which service pushrod 16 extends. Member 30 also defines surrounding apertures through which mounting bolts 42 may extend for mounting actuator 10 within the vehicle. Conventional nuts and washers may be disposed about bolts 42 to securely fasten actuator 10 to the vehicle. Member 32 defines a central aperture 44 centered about axis 40 and through which parking pushrod 22 extends. Member 32 further defines several fluid ports (not shown) through which fluid pressure may be introduced to service brake chamber 26 and/or parking brake chamber 28 to urge service and/or parking diaphragms 14, 20 towards predetermined positions. Member 32 may also define a storage cavity 46 for storing a release tool (not shown) used to manually release the parking brake. Members 32, 34 together define parking brake chamber 28 and receive parking diaphragm 20 therebetween. Members 32, 34 may be held in place by crimping one or both of members 32, 34 or through the use of a clamp as described above or other conventional fasteners. Member 34 define a central aperture 48 centered about axis 40 through which a release tool may be inserted to release the parking brake.

Service diaphragm 14 is provided to urge service pushrod 16 outward from actuator 10 in response to fluid pressure in order to cause application of the vehicle brakes. Diaphragm 14 is conventional in the art. Diaphragm 14 is disposed within chamber 26 and may be held between members 30, 32 of housing 12. Fluid pressure may be introduced to service brake chamber 26 on one side of diaphragm 14 opposite the side on which service pushrod 16 is disposed through a service port (not shown) in member 32. Introduction of fluid pressure to chamber 26 urges service pushrod 16 to a service apply position.

Service pushrod 16 transfers forces generated in actuator 10 to the vehicle brakes in order to apply or release the brakes. Pushrod 16 is disposed about and moves along axis 40. Pushrod 16 may define a yoke 50 at one end of the pushrod 16 disposed outside of housing 12. In a conventional drum brake, for example, the yoke 50 may be coupled to a slack adjuster that is disposed about a camshaft and translates linear movement of the service pushrod 16 into rotational movement of the camshaft and a cam mounted on one end of the camshaft. Rotation of the cam then causes corresponding movement of brakes shoes into and out of engagement with a braking surface in a drum. Pushrod 16 may define a pressure plate 52 at an opposite end from yoke 50. Plate 52 provides a surface on one side configured to engage diaphragm 14 and a surface on the opposite side configured to act as a spring seat for spring 18.

Service spring 18 is provided to bias service pushrod 16 to a service release position. Spring 18 is conventional in the art and is disposed within service brake chamber 26 on one side of service diaphragm 14. Spring 18 is disposed about service pushrod 16 and is seated between member 30 of housing 12 and pressure plate 52 of pushrod 16.

Parking diaphragm 20 is provided to urge parking pushrod 22 in one direction along axis 40 away from the parking apply position and towards the parking release position in response to fluid pressure in order to release the vehicle brakes. Diaphragm 20 is conventional in the art. Diaphragm 20 is disposed within chamber 28 and may be held between members 32, 34 of housing 12. Fluid pressure may be introduced to chamber 28 on one side of diaphragm 20 through a parking port (not shown) in member 32. Introduction of fluid pressure to chamber 28 urges parking pushrod 22 to a parking release position against the force of parking spring 24.

Parking pushrod 22 is provided to cause selective movement of service diaphragm 14 and service pushrod 16 in order to apply a parking brake. Pushrod 22 is disposed about and moves along axis 40 and may be axially aligned with service pushrod 16. Pushrod 22 extends from parking brake chamber 28 into service brake chamber 26. Pushrod 22 includes a pressure plate 54 at one longitudinal end configured to engage parking diaphragm 20 such that pushrod 22 is configured for movement with diaphragm 20. Pushrod 22 includes another pressure plate 60 at an opposite longitudinal end configured for selective engagement with service diaphragm 14.

Parking spring 24 is provided to bias parking pushrod 22 to a parking apply position (and thereby move service pushrod 16 to a service apply position). Spring 24 is conventional in the art and is disposed within parking brake chamber 28 on one side of parking diaphragm 20. Spring 24 is disposed about a hub 62 having a flange 64 at one end with a first side bearing against parking diaphragm 20 and a second side that functions as a spring seat for spring 24.

As described above, service pushrod 16 may be subjected to a force from fluid pressure in service brake chamber 26 that is imparted to service pushrod 16 through service diaphragm 14. Service pushrod 16 may also be subjected to a force from parking spring 24 imparted to service pushrod 16 through parking diaphragm 20, parking pushrod 22 and service diaphragm 14. In most circumstances, pushrod 16 is subjected to at most one of the fluid pressure force or spring force. In certain circumstances, however, fluid pressure forces in the service brake chamber 26 and spring forces in the parking brake chamber 28 may be compounded, or applied simultaneously, against the service pushrod 16. For example, when a vehicle is parked on a hill, the vehicle operator will typically press a foot pedal to apply the service brake (thereby supplying fluid pressure to service brake chamber 26 to apply a fluid pressure force to service pushrod 16) before releasing the parking brake (thereby allowing the parking spring 24 to continue applying a spring force to service pushrod 16). The excess force from compounding can reduce the life of the brake actuator pushrod and downstream components such as slack adjusters.

Figure 2:
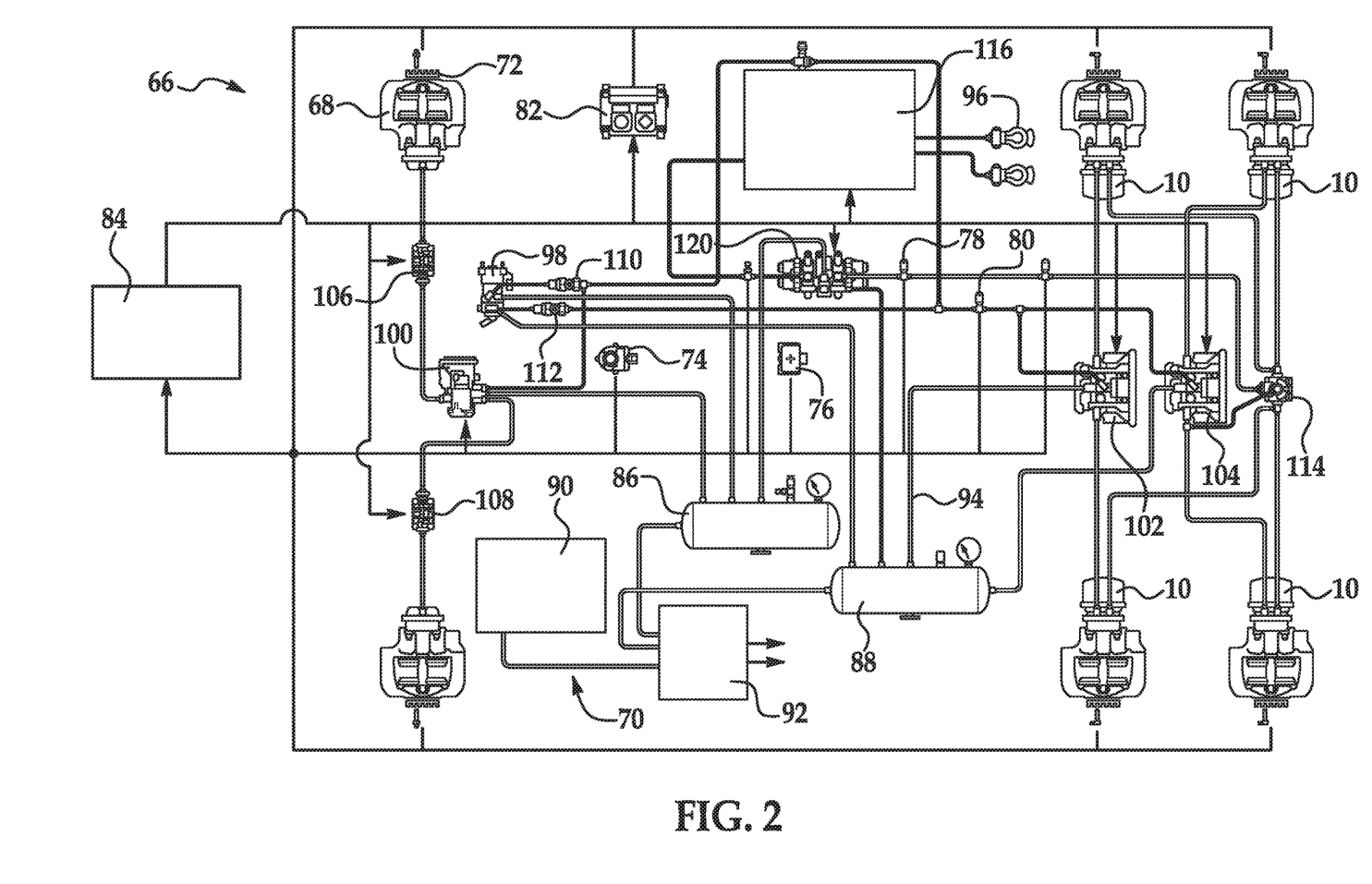
FIG. 2 is a diagrammatic view of a vehicle incorporating one embodiment of a system for controlling compounding in a brake actuator in the vehicle.

Referring now to FIG. 2, a braking system 66 is shown that is configured to brakes wheels on a vehicle in order to slow or stop movement of the vehicle. In accordance with the present teachings, certain components of system 66 also provide a system for controlling compounding in one or more brake actuators 10. In the illustrated embodiment, the vehicle comprises a tractor, or power unit, of a tractor-trailer. It should be understood that many of the components in braking system 10 may also be used to control wheel brakes in any trailers, or towed units, coupled to the tractor. Braking system 66 may be configured to communicate with other vehicle systems over a conventional vehicle communication bus such as a controller area network (CAN) (or another communication medium such as power line communication (PLC)) including, for example, advanced driver assistance systems such as collision avoidance systems that are configured to implement automated emergency braking (AEB) of the vehicle wheels under certain conditions. Braking system 66 may include wheel brakes 68, a fluid circuit 70 that supplies fluid pressure to wheel brakes 68, various sensors including sensors 72, 74, 76, 78, 80, a user interface 82, and one or more controllers 84.

Wheel brakes 68 are configured to apply a braking force to one or more wheels. In the illustrated embodiment, brakes 68 comprise disc brakes in which a carrier supports brake pads on opposite sides of a rotor rotating with the wheel and a brake actuator such as actuator 10 causes, responsive to fluid pressure delivered by fluid circuit 70, movement of a caliper relative to the carrier to move the brake pads into and out of engagement with the rotor. It should be understood, however, that one or more of wheel brakes 68 may alternatively comprise drum brakes in which a brake actuator such as actuator 10 causes, responsive to fluid pressure delivered by fluid circuit 70, movement of one or more brake shoes into engagement with a braking surface in a brake drum rotating with the wheel.

Fluid circuit 70 generates fluid pressure within system 66 and controls the delivery of fluid pressure to the brake actuator 10 of each wheel brake 68. Circuit 70 may include components for generating and storing pressurized fluid including fluid reservoirs 86, 88, a compressor 90, and air dryer 92 and components for routing and delivering fluid pressure to wheel brakes 68 including fluid conduits 94, glad-hand connectors 96 between the tractor and trailers, and various valves including food pedal valve 98, relay valves 100, 102, 104, modulator valves 106, 108, quick release valves 110, 112, 114, a tractor protection valve 116 and parking control valve 120.

Fluid reservoirs 86, 88 store compressed fluid for use in applying wheel brakes 68. Reservoir 86 supplies pressurized fluid to the wheel brakes 68 for the steer axle and has a fluid port coupled to air dryer 92 and fluid ports coupled to foot pedal valve 98, relay valve 100 and parking control valve 120. Reservoir 88 supplies pressurized fluid to the wheel brakes for the drive axles and has a fluid port coupled to air dryer 92 and fluid ports coupled to foot pedal valve 98, relay valves 102, 104, and parking control valve 120.

Compressor 90 draws in air and compresses the air for delivery to reservoirs 86, 88 through air dryer 92. Compressor 90 has one or more fluid ports coupled to air dryer 92.

Air dryer 92 is provided to collect and remove solid, liquid and vapor contaminants from pressurized fluid. Air dryer 92 is disposed between compressor 90 and reservoirs 86, 88 and has fluid ports coupled to compressor 90 and each reservoir 86, 88.

Fluid conduits 94 are used to transport fluid between reservoirs 86, 88, compressor 90, air dryer 92, glad hand connectors 96, valves 98, 100, 102, 104, 106, 108, 110, 112, 114, 116, 120 and wheel brakes 68. Conduits 94 may be made from conventional metals and/or plastics and have connectors at either end configured to join the conduits 94 to corresponding components of fluid circuit 70.

Glad-hand connectors 96 are used to transmit pressurized fluid from the tractor to any trailers. One of connectors 96 is used to transmit fluid used during service braking while the other connector 96 is used to transmit fluid during emergency (or parking) braking.

Valves 98, 100, 102, 104, 106, 108, 110, 112, 114, 116, 120 are provided to control distribution of fluid throughout fluid circuit 70. Foot pedal valve 98 is supported within the cabin of the vehicle and is provided to allow controlled application of the brakes 68 by the vehicle operator for service braking by selectively releasing fluid pressure from fluid reservoirs 86, 88. Actuation of valve 98 by the vehicle operator allows fluid pressure to flow from reservoirs 86, 88 to relay valves 100, 102, 104, and tractor protection valve 116. Relay valves 100, 102, 104 increase the volume of fluid, and therefore the speed, at which fluid is delivered to, and exhausted from, wheel brakes 68 in order to eliminate lag times between the commanded and actual application and release of brakes 68. Relay valves 100, 102, 104 may operate under the control of controller 84 to implement service braking, traction control and stability control when required. Modulator valves 106, 108 are provided to implement an anti-lock braking function. During normal braking, valves 106, 108 allow fluid pressure to pass from relay valve 100 to wheel brakes 68 without interference. During a loss of traction, however, signals from controller 84 cause valves 106, 108 to modulate the fluid pressure to prevent lockup of the wheels. Quick release valves 110, 112, 114 increases the speed at which fluid pressure is exhausted from portions of fluid circuit 70. Valve 114, in particular, increases the speed at which fluid pressure is exhausted from wheel brakes 68 on the drive axle when brakes 68 are released. Tractor protection valve 116 transmits pneumatic signals relating to operation of the trailer wheel brakes from the tractor to the trailer. Valve 116 also protects the fluid supply for the tractor in the event of a break in the fluid connection between the tractor and trailer. Parking control valve 120 delivers fluid to, and exhausts fluid from, wheel brakes 68 on both the drive axles in the tractor and the trailer axles in the trailer(s) (through tractor protection valve 116 and glad hand connector 96) in order to implement parking or emergency braking in the tractor and trailer(s). Referring to FIG. 1, when valve 120 delivers fluid pressure to an actuator 10 for a wheel brake 68, the fluid pressure is provided to parking brake chamber 28 and opposes the spring force of parking spring 24 in the actuator 10 to release the parking brake. When valve 120 exhausts fluid from the parking brake chamber 28 of actuator 10 of wheel brake 68, parking spring 24 sets the parking brake. Valve 120 may operate under the control of controller 84.

Sensors 72, 74, 76, 78, 80 are provided to identify various conditions associated with the vehicle and surrounding environment that impact the operation of braking system 66. Sensors 72 comprise wheel speed sensors that generate signals indicative of the rotational speed of a corresponding wheel and from which controller 84 can determine the speed of the vehicle and whether certain wheels are slipping and implement anti-lock braking through control of relay valves 100, 102, 104 and modulator valves 106, 108. Sensor 74 comprises a steer angle sensor that generates a signal indicative of a steering angle imparted by a vehicle operator to a steering wheel in the vehicle. Sensor 74 may be mounted on a steering column within the vehicle. Sensor 76 comprises a yaw rate sensor 46 that generates a signal indicative of the angular velocity of the vehicle about its vertical (yaw) axis. An electronic stability control system may compare the output of sensors 74, 76 to determine whether the intended direction of travel for the vehicle (as indicated by sensor 74) matches the actual direction of travel (as indicated by sensor 76) and thereby determine whether there has been a loss of traction between the wheels and the road. When the intended and actual directions of the vehicle diverge, the system generates control signals for one or both of the vehicle engine and the wheel brakes 68 in order to control the torque at one or more of the wheels so that the actual direction of the vehicle will match the intended direction. Sensors 78, 80 comprise pressure sensors that generate signals indicative of the fluid pressure within a fluid conduit 98 in fluid circuit 70. In accordance with one aspect of the present teachings, sensor 78 provides an indication of fluid pressure within the parking brake chamber 28 of brake actuator 10 while sensor 80 provides an indication of fluid pressure within the service brake chamber 26 of actuator 10. It should be understood that the above described sensors are exemplary and that additional sensors may be used to identify other conditions that may impact the operation of braking system 10 including, for example, an engine or transmission speed sensor that generates a signal indicative of the speed of the vehicle and/or load sensors that generate signals indicative of the forces at various locations on the vehicle.

User interface 82 provides an interface between the vehicle operator and system 66 through which the operator can control certain vehicle braking functions and receive information about vehicle braking. Interface 82 may include various input devices through which the operator can instruct system 66 to perform various braking functions including controlling the fluid pressure provided to brake actuators 10 on the tractor and trailer to release and apply spring brakes acting as parking brakes for the tractor and trailer. Interface 82 may also include various output devices through which the operator is informed of the status of system 66. These output devices may include light emitters, such as light emitting diodes, or sound emitters, such as a speaker, to convey visual and/or audio warnings, status or other information. In the case of visual output devices, information can be conveyed through differences in color, differences in intensity, differences in the number of lights, and differences in the pattern of activation of the lights. In the case of audio output devices, similar information can be conveyed through differences in the type of sound generated, differences in volume and differences in the pattern of sounds.

Controller 84 controls the operation of relay valves 100, 102, 104, modulator valves 106, 108, tractor protection valve 116 and parking control valve 120 in order to control the fluid pressure delivered to the brake actuators 10 of wheel brakes 68 and, therefore, the braking force applied to the wheels. Controller 84 also controls the output devices in interface 82. Controller 84 may comprise a programmable microprocessor or microcontroller or may comprise an application specific integrated circuit (ASIC). Controller 84 may include a memory and a central processing unit (CPU). Controller 84 may also include an input/output (I/O) interface including a plurality of input/output pins or terminals through which the controller 84 may receive a plurality of input signals and transmit a plurality of output signals. The input signals may include signals received from sensors 72, 74, 76, 78, 80 and user interface 82. The output signals may include signals used to control relay valves 100, 102, 104, modulator valves 106, 108, tractor protection valve 116, and parking control valve 120 and signals used to control output devices on user interface 82. Although a single controller 84 is shown in the illustrated embodiment, it should be understood that the functionality of controller 84 could be subdivided among multiple controllers configured to communicate with one another over a conventional vehicle communication bus such as a controller area network (CAN) (or another communication medium such as power line communication (PLC)). In certain embodiments, controller 84 may comprise a controller used in a braking control system for service braking such as the control system offered by the applicant Bendix Commercial Vehicle Systems LLC under the name "ESP Full Stability System". In other embodiments, controller 84 may comprise a controller used in a braking control system for parking (or emergency) braking such as the control system offered by the applicant under the name "Intellipark." In yet other embodiments, controller 84 may comprise a plurality of controllers including controllers used in braking control systems for both service braking and parking (or emergency) braking. Controller 84 may be configured with appropriate programming instructions (i.e., software or a computer program) to implement the control of wheel brakes 68. In accordance with the present teachings, controller 84 may also be configured with appropriate programming instructions to implement a method for controlling compounding in one or more brake actuators 10. The instructions or computer program may be encoded on a non-transitory computer storage medium such as a memory within, or accessible by, controller 84.

Figure 3:
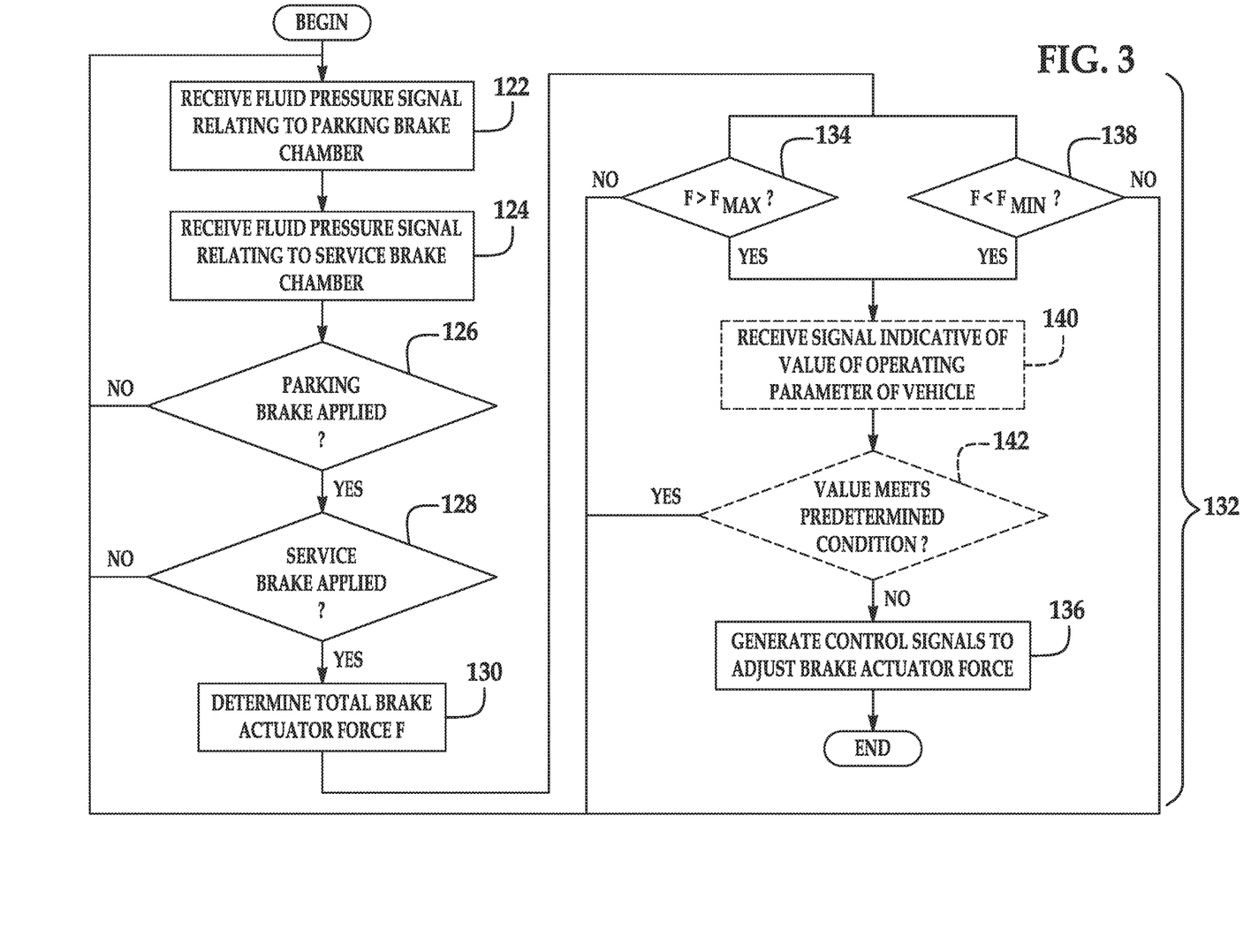
FIG. 3 is a flowchart illustrating embodiments of a method for controlling compounding in a brake actuator of a vehicle.

Referring now to FIG. 3, a method for controlling compounding in one or more brake actuators 10 of a vehicle may begin with the step 122 of receiving a fluid pressure signal indicative of the fluid pressure in the parking brake chamber 28 of the brake actuator 10. As discussed above, the fluid pressure in parking brake chamber 28 acts against the spring force generated by parking spring 24 that is ultimately applied to service pushrod 16. The level of fluid pressure in chamber 28 is therefore indicative of the amount of force that is being transmitted from parking spring 24 to service pushrod 16. In particular, a lower level of fluid pressure in chamber 28 indicates that a higher level of spring force is being transmitted to pushrod 16 while a higher level of fluid pressure in chamber 28 indicates that a lower level of spring force is being transmitted to pushrod 16. A fluid pressure signal indicative of the fluid pressure in parking brake chamber 28 may be generated by a pressure sensor such as pressure sensor 78 and controller 84 may be configured to receive the signal generated by pressure sensor 78.

The method may continue with the step 124 of receiving a fluid pressure signal indicative of the fluid pressure in the service brake chamber 26 of the brake actuator. As discussed above, the fluid pressure in the service brake chamber 26 generates a fluid force against service diaphragm 14 that is transferred to pushrod 16 to implement service braking. The level of fluid pressure in chamber 26 is indicative of the amount of fluid force that is being transmitted to pushrod 16. A fluid pressure signal indicative of the fluid pressure in service brake chamber 26 may be generated by a pressure sensor such as pressure sensor 80 and controller 84 may be configured to receive signal generated by pressure sensor 80.

The method may continue with the steps 126, 128 of determining whether the parking brake is set or applied and determining whether the service brake is being applied by the vehicle operator. Controller 84 may be configured to implement compounding control only under certain vehicle operating conditions. In the illustrated embodiment, controller 84 may implement subsequent steps in the method only when the parking brake is set and the vehicle operator nevertheless applies the service brake. Referring to FIG. 1, in this circumstance, parking spring 24 applies a spring force through the parking pushrod and the service pushrod 16 that is then compounded by a fluid force supplied to service brake chamber 26 under the command of the vehicle operator and acting against service diaphragm 14 and the service pushrod 16. Controller 84 may determine whether the parking brake is set or applied responsive to a measure of the fluid pressure in parking brake chamber 28. In particular, controller 84 may determine that the parking brake is set when the fluid pressure signal from pressure sensor 78 obtained in step 122 indicates the absence of fluid pressure in parking brake chamber 28 (i.e., that the fluid pressure is zero). Controller 84 may determine whether service brake is set or applied responsive to a measure of the fluid pressure in service brake chamber 28. In particular, controller 84 may determine that the service brake is being applied when the fluid pressure signal from pressure sensor 80 obtained in step 124 indicates the presence of fluid pressure in service brake chamber 26 (i.e. that the fluid pressure is greater than zero).

If controller 84 determines that the parking brake is set or applied and the service brake is also being applied, the method may continue with the step 130 of determining a total brake actuator force applied to service pushrod 16 of brake actuator 10 in response to fluid pressure measurements obtained in steps 122, 124. In particular, controller 84 may sum the spring force being applied by parking spring 24 to service pushrod 16 as indicated by the level of fluid pressure in parking brake chamber 28 (which has an inverse relationship to the spring force) and the fluid force being applied by the fluid pressure in service brake chamber 26 as indicated by the level of fluid pressure in service brake chamber 26.

The method may conclude with the step 132 of controlling, responsive to the total brake actuator force, at least one of a valve configured to control the fluid pressure in parking brake chamber 28 of brake actuator 10 and a valve configured to control the fluid pressure in service brake chamber 26 of brake actuator 10. Controller 84 may, for example, control a relay valve 102, 104 to adjust the fluid pressure in service brake chamber 26. Alternatively, or in addition, controller 84 may control quick release valve 114 and/or parking control valve 120 to adjust the fluid pressure in parking brake chamber 28. In this manner, controller 84 may adjust the fluid force applied to pushrod 16 through service diaphragm 14 and/or the spring force applied to pushrod 16 by parking spring 24 to obtains an adjusted total brake actuator force on pushrod 16 and control compounding in brake actuator 10.

Step 132 may include various substeps depending on the objective in controlling compounding within actuator brake actuator 10. In accordance with some embodiments, controller 84 may be configured to prevent compounding under certain circumstances in order to limit or prevent a reduction in the life of components in the brake actuator or downstream braking components such as slack adjusters. In one embodiment, step 132 includes the substep 134 of determining whether the total brake actuator force meets a predetermined condition relative to a threshold (maximum) brake actuator force (e.g., exceeds a maximum brake actuator force) and the substep 136 of generating control signals for one or more valves that are configured to control the fluid pressure within the parking brake chamber 26 and service brake chamber 28 in brake actuator 10 when the total brake actuator force meets the predetermined condition. Controller 84 may, for example, generate a control signal to a relay valve 102, 104 to adjust the fluid pressure in service brake chamber 26. Alternatively, or in addition, controller 84 may generate a control signal to quick release valve 114 and/or parking control valve 120 to adjust the fluid pressure in parking brake chamber 28. In this manner, controller 84 may limit the total force applied to pushrod 16 to a level below the threshold (maximum) brake actuator force. In certain embodiments, the threshold brake actuator force may be a predetermined value equal to, for example, the sum of the spring force of parking spring 24 and a predetermined offset intended to limit a reduction in the life of components in the brake actuator 10 or downstream braking components by a desired amount. In other embodiments, the controller 84 may be configured to establish the threshold brake actuator force responsive to the value of one or more operating parameters of the vehicle. In particular, it may be desirable to adjust the level of compounding allowed based on parameters associated with the vehicle itself (e.g., speed, acceleration, direction of travel) and/or its environment (e.g., temperature, elevation, location of nearby vehicles or road infrastructure) including, for example, a speed of the vehicle, a steer angle of the vehicle, a yaw rate of the vehicle, an inclination of the vehicle, a weight of the vehicle, a driver parking brake demand, and a driver service brake demand. Therefore, controller 84 may be configured to receive signals indicative of an operating parameter of the vehicle and to establish the threshold brake actuator force in response to those signals. In various embodiments, controller 84 may be configured to receive signals from one or more of speed sensors 72, steer angle sensor 74, yaw rate sensor 76, temperature sensors, GPS sensors, radar/lidar sensors, etc. that are indicative of operating parameters of the vehicle and to establish the threshold brake actuator force in response to those signals.

In accordance with other embodiments, controller 84 may be configured to implement compounding. In certain circumstances, compounding may be desirable. For example, in some heavy vehicles, compounding may be useful to meet regulatory or other requirements for implementing emergency braking including, for example, timing requirements between operator actuation of emergency braking and application of the parking or emergency brake. Compounding may also be useful when the actual brake actuator force fails to meet the operator commanded or expected brake actuator force due to, for example, wear or the failure of a braking system component. Thus, in certain embodiments, step 132 may include the sub step 138 of determining whether the total brake actuator force meets a predetermined condition relative to a threshold (minimum) brake actuator force (e.g., is below a minimum brake actuator force) and the substep 136 of generating control signals for one or more valves (such as quick release valve 114, parking control valve 120 or relay valves 102, 104) that are configured to control the fluid pressure within the parking brake chamber 26 and/or service brake chamber 28 in brake actuator 10 when the total brake actuator force meets the predetermined condition. In this manner, controller 84 generates control signals to one or more valves to adjust the fluid pressure in one or both of service brake chamber 26 and parking brake chamber 28 of brake actuator 10 to increase the total force applied to pushrod 16 to a level above the threshold (minimum) brake actuator force. In certain embodiments, the threshold brake actuator force may again be a predetermined value. In other embodiments, the controller 84 may again be configured to establish the threshold brake actuator force responsive to the value of one or more operating parameters of the vehicle. In some embodiments, for example, controller 84 may establish the threshold brake actuator force in response to the commanded brake actuator force by the vehicle operator. Controller 84 may receive signals indicative of the commanded brake actuator force from, for example, sensors associated with the position or movement of foot pedal valve 98 or from user interface 82 and establish the threshold brake actuator force responsive to one or more of these signals. It again may also be desirable to adjust the level of compounding allowed based on other parameters associated with the vehicle itself (e.g., speed, acceleration, direction of travel) and/or its environment (e.g., temperature, elevation, location of nearby vehicles or road infrastructure) including, for example, a speed of the vehicle, a steer angle of the vehicle, a yaw rate of the vehicle, an inclination of the vehicle, a weight of the vehicle, a driver parking brake demand, and a driver service brake demand. Therefore, controller 84 may be configured to receive signals indicative of an operating parameter of the vehicle and to establish the threshold brake actuator force in response to those signals. In various embodiments, controller 84 may be configured to receive signals from one or more of speed sensors 72, steer angle sensor 74, yaw rate sensor 76, temperature sensors, GPS sensors, radar/lidar sensors, etc. that are indicative of operating parameters of the vehicle and to establish the threshold brake actuator force in response to those signals.

As set forth above, controller 84 is configured in various embodiments to control one or more valves used in controlling fluid pressure in parking brake chamber 28 of brake actuator 10 and/or service brake chamber 26 of brake actuator 10 responsive to the total brake actuator force determined by controller 84 in step 130 for the purpose of generating an adjusted total brake actuator force. Controller 84 may, however, also consider information other than the total brake actuator force determined in step 130 when generating the control signals for the valves in step 136. Referring to FIG. 3, in some embodiments, controller 84 may refrain from generating any control signals depending on the status of various operating parameters associated with the vehicle. The status of certain operating parameters may counsel against any adjustments to the brake actuator force due to safety or other concerns. Thus, the method may include the steps 140, 142 of receiving a signal indicative of a value of an operating parameter of the vehicle and determining whether the value meets a predetermined condition relative to a predetermined value. If the value of the operating parameter meets the predetermined condition, controller 84 may refrain from generating any control signals in steps 136 that would adjust the total brake actuator force. The operating parameters may again include parameters associated with the vehicle (e.g., speed, acceleration, direction of travel) and/or its environment (e.g., temperature, elevation, location of nearby vehicles or road infrastructure) including, for example, a speed of the vehicle, a steer angle of the vehicle, a yaw rate of the vehicle, an inclination of the vehicle, a weight of the vehicle, a driver parking brake demand, and a driver service brake demand. In yet other embodiments, the method may omit steps 140, 142 and controller 84 may generate control signals in step 136 that are responsive to both the total brake actuator force determined in step 130 and the value of an operating parameter of the vehicle. Controller 84 may, for example, generate control signals in step 136 that are intended to achieve an adjusted total brake actuator force that is greater than or less than the adjusted total brake actuator force that would have been achieved based on the previously determined total brake actuator force alone. For example, a relatively high vehicle speed or relatively high humidity in the surrounding environment may provide reasons to increase the adjusted total brake actuator force relative to the force that would have been generated based on the previously determined total brake actuator force alone.

A system and method for controlling compounding in a brake actuator of a vehicle in accordance the present teachings represent an improvement as compared to conventional systems and methods. In particular, the system and method enable control of compounding using existing vehicle fluid system components thereby avoiding the need for a special purpose anti-compounding valve. As a result, compounding control can be implemented on vehicles to preserve the life of brake actuator components and other vehicle components without incurring the additional expense and weight of an anti-compounding valve. The inventive system and method also enable more precise and rapid control of compounding and the ability to adjust compounding strategies for different vehicle operating conditions.

While the invention has been shown and described with reference to one or more particular embodiments thereof, it will be understood by those of skill in the art that various changes and modifications can be made without departing from the spirit and scope of the invention.

What is claimed is:

1. A system for controlling compounding in one or more brake actuators of a vehicle, comprising:
 a first valve configured to control a first fluid pressure in a parking brake chamber of a brake actuator that acts against a spring force applied by a spring of the brake actuator to a pushrod of the brake actuator;
 a second valve configured to control a second fluid pressure in a service brake chamber of the brake actuator that applies a fluid force to the pushrod of the brake actuator; and,
 a controller configured to
 receive a first fluid pressure signal indicative of the first fluid pressure;
 receive a second fluid pressure signal indicative of the second fluid pressure;
 determine a total brake actuator force applied to the pushrod of the brake actuator responsive to the first fluid pressure signal and second fluid pressure signal; and,
 control, responsive to the total brake actuator force, at least one of the first valve and the second valve to adjust a corresponding one of the first fluid pressure and the second fluid pressure and thereby obtain an adjusted total brake actuator force.

2. The system of claim 1, wherein the controller is further configured, in controlling at least one of the first valve and the second valve, to determine whether the total brake actuator force meets a predetermined condition relative to a threshold brake actuator force and to generate a control signal for the at least one of the first valve and the second valve when the total brake actuator force meets the predetermined condition relative to the threshold brake actuator force.

3. The system of claim 2 wherein the controller is further configured to establish the threshold brake actuator force responsive to a value of an operating parameter of the vehicle.

4. The system of claim 3 wherein the operating parameter comprises one of a speed of the vehicle, a steer angle of the vehicle, a yaw rate of the vehicle, an inclination of the vehicle, a weight of the vehicle, a driver parking brake demand, and a driver service brake demand.

5. The system of claim 1 wherein the controller is further configured, in controlling at least one of the first valve and the second valve, to receive a signal indicative of a value of an operating parameter of the vehicle and to generate a control signal for the at least one of the first valve and the second valve only when the value of the operating parameter meets a predetermined condition relative to a predetermined value.

6. The system of claim 5 wherein the operating parameter comprises one of a speed of the vehicle, a steer angle of the vehicle, a yaw rate of the vehicle, an inclination of the vehicle, a weight of the vehicle, a driver parking brake demand, and a driver service brake demand.

7. An article of manufacture, comprising:
a non-transitory computer storage medium having a computer program encoded thereon that when executed by a controller controls compounding in one or more brake actuators of a vehicle, the computer program including code for
determining a total brake actuator force applied to a pushrod of a brake actuator responsive to a first fluid pressure in a parking brake chamber of the brake actuator that acts against a spring force applied by a spring of the brake actuator to a pushrod of the brake actuator and a second fluid pressure in a service brake chamber of the brake actuator that applies a fluid force to the pushrod of the brake actuator; and,
controlling, responsive to the total brake actuator force, at least one of a first valve configured to control the first fluid pressure and a second valve configured to control the second fluid pressure to adjust a corresponding one of the first fluid pressure and the second fluid pressure and thereby obtain an adjusted total brake actuator force.

8. The article of manufacture of claim 7, wherein the code for controlling includes code for determining whether the total brake actuator force meets a predetermined condition relative to a threshold brake actuator force and generating a control signal for the at least one of the first valve and the second valve when the total brake actuator force meets the predetermined condition relative to the threshold brake actuator force.

9. The article of manufacture of claim 8 wherein the computer program further includes code for establishing the threshold brake actuator force responsive to a value of an operating parameter of the vehicle.

10. The article of manufacture of claim 9 wherein the operating parameter comprises one of a speed of the vehicle, a steer angle of the vehicle, a yaw rate of the vehicle, an inclination of the vehicle, a weight of the vehicle, a driver parking brake demand, and a driver service brake demand.

11. The article of manufacture of claim 7 wherein the at least one of the first valve and the second valve is the first valve.

12. The article of manufacture of claim 7 wherein the code for controlling includes code for determining whether a value of an operating parameter of the vehicle meets a predetermined condition relative to a predetermined value and for generating a control signal for the at least one of the first valve and the second valve only when the value of the operating parameter meets the predetermined condition relative to the predetermined value.

13. The article of manufacture of claim 12 wherein the operating parameter comprises one of a speed of the vehicle, a steer angle of the vehicle, a yaw rate of the vehicle, an inclination of the vehicle, a weight of the vehicle, a driver parking brake demand, and a driver service brake demand.

14. The article of manufacture of claim 7 wherein the computer program only executes the code for determining the total brake actuator force when the first fluid pressure is zero and the second fluid pressure is greater than zero.

15. A method for controlling compounding in one or more brake actuators of a vehicle, comprising the steps of:
receiving a first fluid pressure signal indicative of a first fluid pressure in a parking brake chamber of a brake actuator that acts against a spring force applied by a spring of the brake actuator to a pushrod of the brake actuator;
receiving a second fluid pressure signal indicative of a second fluid pressure in a service brake chamber of the brake actuator that applies a fluid force to the pushrod of the brake actuator;
determining a total brake actuator force applied to the pushrod of the brake actuator responsive to the first fluid pressure signal and the second fluid pressure signal; and,
controlling, responsive to the total brake actuator force, at least one of a first valve configured to control the first fluid pressure and a second valve configured to control the second fluid pressure to adjust a corresponding one of the first fluid pressure and the second fluid pressure and thereby obtain an adjusted total brake actuator force.

16. The method of claim 15 wherein the controlling step includes the sub steps of:
determining whether the total brake actuator force meets a predetermined condition relative to a threshold brake actuator force; and,
generating a control signal for the at least one of the first valve and the second valve when the total brake actuator force meets the predetermined condition relative to the threshold brake actuator force.

17. The method of claim 16, further comprising the step of establishing the threshold brake actuator force responsive to a value of an operating parameter of the vehicle.

18. The method of claim 17 wherein the operating parameter comprises one of a speed of the vehicle, a steer angle of the vehicle, a yaw rate of the vehicle, an inclination of the vehicle, a weight of the vehicle, a driver parking brake demand, and a driver service brake demand.

19. The method of claim 15 wherein the controlling step includes the substeps of:

receiving a signal indicative of a value of an operating parameter of the vehicle; and, generating a control signal for the at least one of the first valve and the second valve only when the value of the operating parameter meets the predetermined condition relative to the predetermined value.

20. The method of claim 19 wherein the operating parameter comprises one of a speed of the vehicle, a steer angle of the vehicle, a yaw rate of the vehicle, an inclination of the vehicle, a weight of the vehicle, a driver parking brake demand, and a driver service brake demand.

* * * * *